March 8, 1955 A. H. JOHNSON 2,703,863

HIGH-FREQUENCY TITRIMETER

Filed Dec. 11, 1953 2 Sheets-Sheet 1

INVENTOR.
ARTHUR H. JOHNSON,
BY
McMorrow, Berman + Davidson
ATTORNEYS.

INVENTOR.
ARTHUR H. JOHNSON,
BY
McMorrow, Berman + Davidson
ATTORNEYS.

2,703,863
Patented Mar. 8, 1955

2,703,863

HIGH-FREQUENCY TITRIMETER

Arthur H. Johnson, Marquette, Mich.

Application December 11, 1953, Serial No. 397,558
3 Claims. (Cl. 324—30)

This invention relates to apparatus for performing chemical analysis, and more particularly to an apparatus for the determination of end points in titrations.

A main object of the invention is to provide a novel and improved titrimeter of the type wherein the end point of a titration is determined by observing changes in the resistivity of the solution being titrated to high frequency current, the improved titrimeter being arranged so that the loading of the oscillator by the solution being titrated is purely resistive, whereby the response of the instrument is a function of only one varible, namely, high frequency conductivity of the solution.

A further object of the invention is to provide an improved high frequency titrimeter of the type employing a tank circuit including a loop in which a vessel containing the solution to be titrated is inserted, the apparatus being arranged to that the operating frequency of the oscillator is determined solely by the inductance of the loop used and by the total shunt capacity employed with the loop, and by the other normal capacities of the circuit, such as the interelectrode capacities of the oscillator tube, but is not effected by the solution in the titrating vessel, the vessel and the solution contributing no reactive components which would cause changes in said operating frequency during the course of the titration.

A still further object of the invention is to provide an improved high frequency titrimeter of the type employing an oscillator and a tank circuit including a loop in which a vessel containing the solution to be titrated is placed, the improved apparatus having a loop possessing very low distributed capacity and the solution in the vessel being sufficiently removed from the loop to substantially isolate it from the field of the distributed capacity of the loop, whereby the frequency of the oscillator remains constant during the course of a titration and no adjustments need be made to correct for reactive effects as in titrimeters of the prior art.

A still further object of the invention is to provide an improved high frequency titrimeter having high sensitivity, which will operate over a wide range of solution conductivities, and which may be readily adjusted for use with any desired concentration range of solution to be titrated.

Further objects and advantages of the invention will become apparent from the following description and claims, and from the accompanying drawings, wherein:

In high frequency titrimeters of the prior art, a serious disadvantage resides in the fact that as the loading of the oscillator by the solution being titrated changes, the reactive effects produce changes in the frequency of the oscillator, and therefore during the course of a titration, the oscillator must be frequently adjusted either to maintain its frequency constant or to otherwise compensate for the reactance effects produced by the solution undergoing titration. An important advantage of the titrimeter of the present invention is that the loading of the oscillator by the solution in the vessel inserted in the oscillator tank loop is purely resistive. Hence, the response of the instrument is a function of only one variable namely, the high frequency conductivity of the solution. The operating frequency of the oscillator in the improved instrument of the present invention is determined solely by the inductance of the loop used and by the total shunt capacity provided across the loop and defined by the normal arrangement of the elements of the circuit, such as by the interelectrode capacities of the oscillator tube. The solution placed in the vessel in the loop and the vessel itself contribute no reactive components which cause change in the operating frequency during the course of a titration.

A main feature of the invention resides in the improved construction of the one-turn loop employed to receive the vessel containing the solution to undergo titration. The loop itself is arranged so that it has very low distributed capacity, said capacity being distributed along the circumference of the loop. A vessel of non-conducting material is placed along the axis of the loop, the diameter of the vessel being smaller than that of the loop by an amount sufficient to remove it completely from the field of the distributed capacity of the loop, therefore removing capacitive coupling from between the solution and the loop. As a result, during the course of a titration with the apparatus of the present invention, the frequency of the oscillator remains constant and no adjustment need be made to correct for reactive effect, as in the titrimeters of the prior art. With the elimination of the reactive effects, the sensitivity of the instrument is greatly increased. Furthermore, the instrument is arranged so that it will operate satisfactorily with solutions having a wide range of conductivities, for example, with solutions up to those having conductivities equivalent to a 5.0 normal aqueous solution of sodium chloride.

Figures 3, 4, 5:
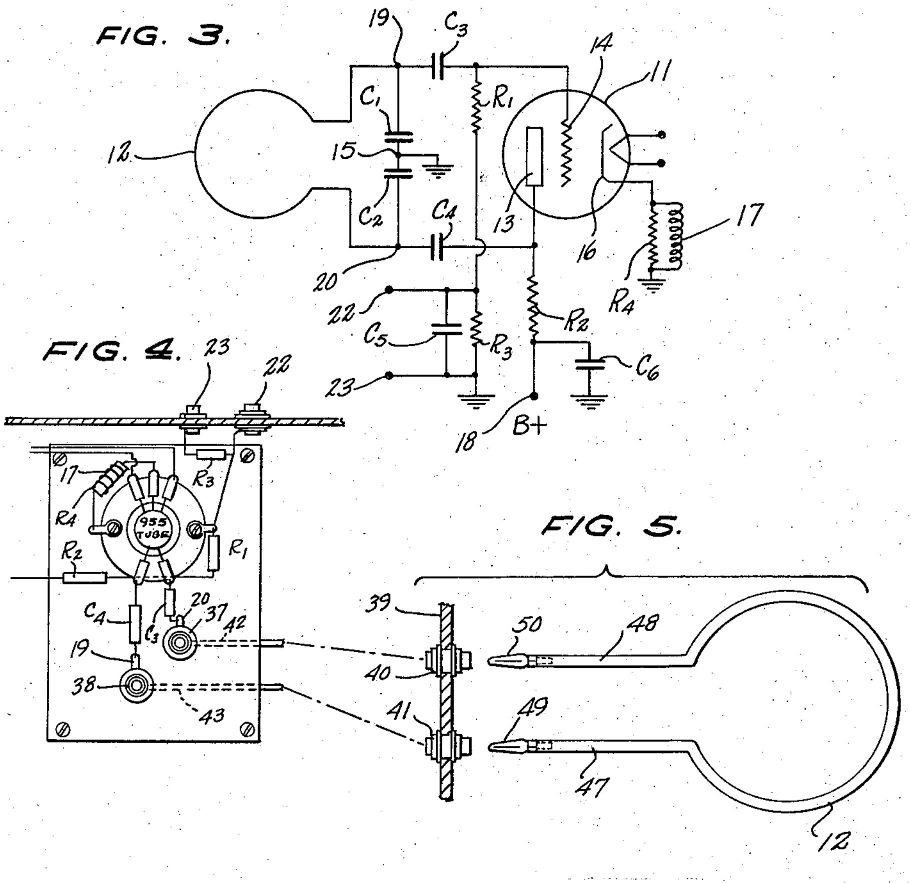
Figure 3 is a schematic wiring diagram of the high frequency titrimeter illustrated in Figures 1 and 2.
Figure 4 is a pictorial schematic wiring diagram showing the connections leading to the tube socket terminals of the oscillator employed in the titrimeter of Figures 1 to 3.
Figure 5 is a plan view of the tank inductance loop employed with the oscillator and showing a portion of the oscillator housing wall and the jack element mounted therein for receiving the terminals of the tank inductance loop.

Referring to the drawings, Figure 3 diagrammatically illustrates the oscillator circuit employed in the apparatus of the present invention. From Figure 3 it will be seen that an oscillator tube 11 is connected in a circuit of the Colpitts type, wherein the tank circuit, comprising the tank inductance 12 and the resultant capacity defined by a pair of series connected condensers C1 and C2, is connected between the plate 13 and the grid 14 of the tube 11. The junction point 15 between the series connected capacitors C1 and C2 is connected to ground. The cathode 16 of the tube is connected to ground through the bias resistor R4. A radio frequency choke, shown at 17, and consisting of approximately five turns of number 22 enameled wire is connected across the resistor R4. The resistor R4 may have a value of approximately 100 ohms, in the circuit illustrated, wherein, for example, a 955 tube is employed as the oscillator tube. The positive terminal of a suitable source of plate voltage is connected through a plate resistor R2 to the plate 13. Connected in series between grid 14 and ground are the resistors R1 and R3. Resistor R3 may have a value of approximately 1000 ohms. Resistors R1 and R2 may have values of approximately 15,000 ohms. A bypass condenser C6 is connected between the plate voltage terminal 18 and ground, as shown. A similar bypass condenser C5 is connected across the resistor R3. Respective coupling condensers C3 and C4 are connected respectively between terminal 19 of the tank circuit and grid 14, and between the remaining terminal 20 of said tank circuit and plate 13. Condensers C3, C4, C5 and C6 may be identical 100 micro microfarad mica condensers.

A sensitive current measuring device is connected between the terminals 22 and 23, namely, across the resistor R3 to measure the changes in grid current of the oscillator during the course of a titration. As will be presently explained, the vessel containing the liquid being titrated is positioned inside the tank inductance loop 12 in a manner to be free of reactive coupling therewith, whereby the changes in high frequency conductivity of the solution in the vessel produce the changes in the grid current of the oscillator which will be indicated on the instrument connected across terminals 22 and 23. This instrument may be, for example, a Sargent model 21 polarograph, with a standard resistance employed in the polarograph circuit in place of the dropping mercury electrode. Obviously, any suitable sensitive current measuring device may be employed at the terminals 22, 23.

Figure 1:
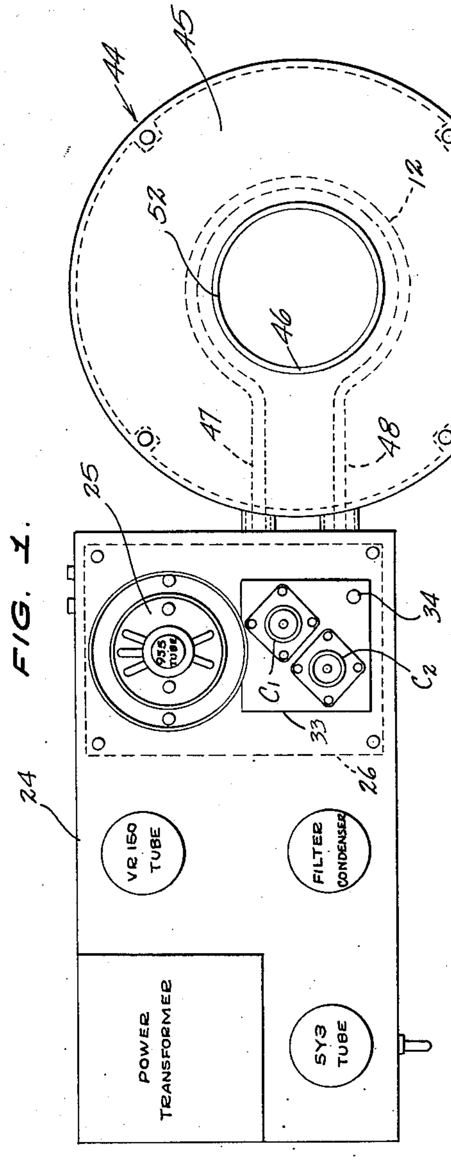
Figure 1 is a top plan view of an improved high frequency titrimeter constructed in accordance with the present invention.

The oscillator is powered by a conventional full-wave rectifier, voltage-regulated, power supply whose elements are shown in Figure 1 as mounted on one end portion of the main oscillator housing 24. The socket 25 of the 955 tube and the other associated parts of the oscillator are mounted on a subchassis comprising a rectangular aluminum plate 26 which is fastened to the top wall 27 of the main housing 24 by screws 28 provided with suitable spacers 29. The tank capacitors C1 and C2 comprise a pair of short upstanding sections of concentric cable mounted in conventional cable plugs 30 which are received in respective receptacles 31 and 32, which are in turn mounted in a rectangular brass plate of substantial thickness, shown at 33, which is supported on the top wall 27 of the main housing 24 and which is fastened thereto by a screw 34 in one corner of the plate 33. Banana plugs 35 are soldered to the center conductors of the receptacles 31 and 32, said center conductors protruding through an aperture 36 provided in the top wall 27 of main housing 24. The banana plugs 35 are received in banana jacks 37 provided on the subchassis 26.

The coaxial cable element employed to define the condensers C1 and C2 may comprise short lengths of RG–8/U coaxial cable, and the plug elements 30 may comprise Amphenol type 83–1SP plugs, to which the short lengths of coaxial cable are connected in the conventional manner, the plugs being received in receptacles 31 and 32 which may comprise Amphenol type 83–1RTY receptacles.

A suitable aperture is provided in the top wall 27 of housing 24 to permit the mounting of the 955 tube in its socket 25.

The outer conductors of the coaxial cable sections defining condensers C1 and C2 are connected to ground through the brass plate 33, which is in turn connected by screw 34 to the top wall 27 of the metal housing 24. The banana plug element 35 of the condenser C1 engages the banana jack 37. The plug element of the condenser C2 similarly engages a second banana jack 38. The banana jack 37 has the terminal 19 and the banana jack 38 has the terminal 20. As above explained, the terminals 19 and 20 are connected through respective coupling condensers C3 and C4 to the grid 14 and to the plate 13 of the tube 11, respectively. Mounted in the side wall 39 of the main housing 24 are respective banana jacks 40 and 41. Banana jack 40 is connected to the banana jack 37, as by a suitable conductor 42, and banana jack 41 is connected to banana jack 38, as by a suitable conductor 43.

Figure 2:
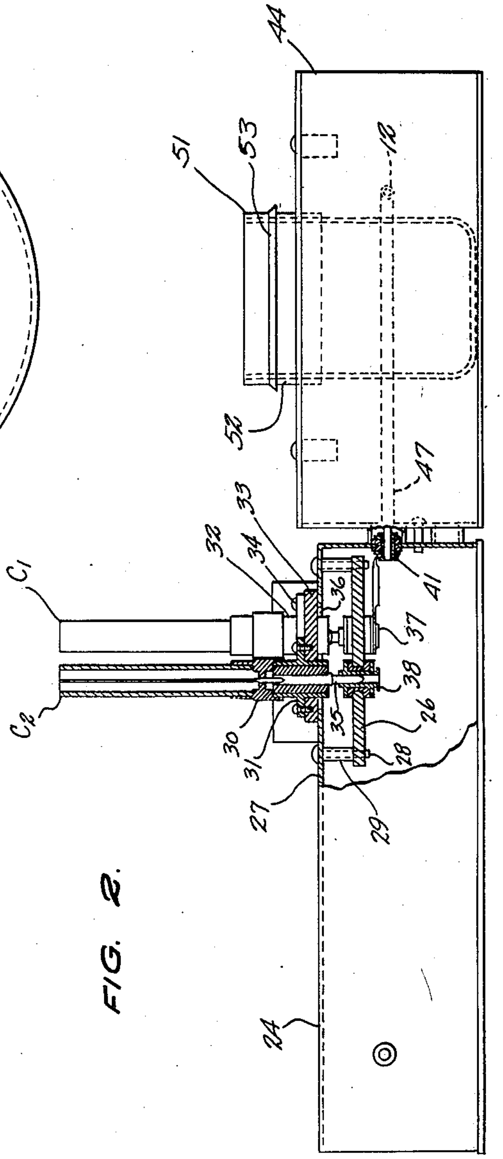
Figure 2 is a side elevational view of the titrimeter of Figure 1, partly in vertical cross section.

Designated generally at 44 is a tank coil unit which comprises a circular metal housing of copper or similar non-magnetic metal which has a top wall 45 provided with a circular central aperture 46. The tank loop 12 is positioned in the circular housing coaxially therewith and substantially midway between the top and bottom walls thereof, as shown in Figure 2. The loop 12 is provided with the parallel terminal ends 47 and 48 which are provided at their ends with the respective banana plugs 49 and 50, the terminal ends 47 and 48 being insulatingly secured in and extending through the wall of the shield housing 44. As shown in Figure 5, the banana plug elements 49 and 50 are spaced so that they are receivable in the banana jacks 41 and 40 mounted in the vertical wall 39 of the main housing 24, so that the tank inductance unit 44 may be electrically connected into the oscillator circuit by the engagement of the banana plugs 49 and 50 in the banana jacks 41 and 40 in the manner illustrated in Figures 1 and 2.

Generally designated at 51 is a polyethylene vessel which is cylindrical in shape and which is dimensioned to slidingly fit inside the circular aperture 46, engaging the rim of said aperture and being adapted to reach the bottom wall of the circular housing of the unit 44 in the manner illustrated in Figure 2. The top wall 45 of the unit 44 is provided around the aperture 46 with an upstanding cylindrical collar 52 which is engageable beneath a peripheral rim element 53 provided on the vessel 51 to support the vessel in a position wherein its bottom wall just engages the bottom wall of the main housing of the unit 44.

In a typical embodiment of the invention, the housing of the inductance unit 44 was seven inches in diameter, the main interior circular portion of the inductance loop 12 was 3¼ inches in diameter, and the aperture 46 was 2½ inches in diameter. The height of the unit 44 was 2⅞ inches, and the loop 12 was supported substantially in the median horizontal plane of the unit 44.

With the parts arranged as above described, the reactive coupling between the liquid in the vessel 51 is substantially eliminated and the loading of the oscillator by the solution in the vessel positioned in the loop 12 is substantially purely resistive. Hence, the instrument response is a function of only the high frequency conductivity of the liquid. The operating frequency of the oscillator is determined solely by the inductance of the loop 12 and by the total shunt capacity defined by the series connection of condenser C1 and C2, and by the other normal capacities existing in the oscillator circuit, such as interelectrode capacities of the 955 tube.

In a typical embodiment of the invention, a loop 12 and capacities C1 and C2 were selected wherein the operating frequency was fixed between 70 and 90 megacycles per second. Obviously, the capacitors C1 and C2 are adjustable to any desired value of capacity by cutting the associated coaxial cable sections to the desired lengths. The amount of positive feed back in the oscillator circuit is varied by varying the ratio of the capacitors C1 and C2. The selection of the proper ratio of C1 and C2 at the beginning of a titration will result in a linear titration curve.

Figure 6:
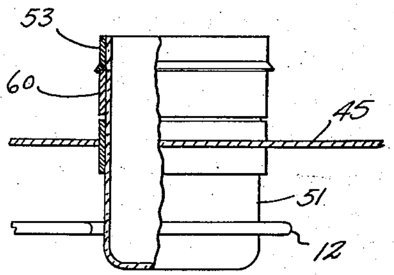
Figure 6 is a vertical cross sectional detail view taken through a portion of the housing of the tank inductance and the vessel for containing the solution to be titrated, showing a modification of the titrimeter according to the present invention.

For solutions having conductivities less or equivalent to a 0.1 normal aqueous solution of sodium chloride, a loop having a diameter of 3¼ inches was employed, with the vessel 51 having a diameter of 2½ inches. The loading of the oscillator by the solution may be reduced by withdrawing the vessel along the axis of the loop and supporting it in an elevated position, as shown for example, in the arrangement of Figure 6, wherein a copper ring 60 is provided between the upstanding collar 52 and the rim 53 of the vessel. By the use of a ring 60 of desired height, the volume of solution in the field of the loop 12 may be adjusted to any desired value.

For solutions having conductivities greater than a 0.1 normal aqueous solution of sodium chloride, a larger loop having a diameter of 4 inches was employed. Using various combinations of C1 and C2, vessel position, and the 4 inch loop, the range of the instrument was made useful up to conductivities equivalent to a 5.0 normal aqueous solution of sodium chloride.

From the above description, it will be apparent that the instrument may be adjusted to any particular concentration range by (1) varying the capacities of C1 and C2, (2) increasing or decreasing the diameter of the loop 12, provided the loop diameter is maintained great enough to keep the vessel and its contents from changing the distributed capacity of the loop, and (3) varying the volume of solution in the field of the loop by adjusting the position of the vessel 51 along the loop axis.

In the above described device, since the loading of the oscillator is purely resistive, no frequency changes occur, and no adjustments to the tank circuit are necessary during a titration.

While the instrument described above is specifically intended for use in chemical analysis, it will be apparent that with slight modification it can be arranged to provide a continuous record of changes taking place in a closed system, or for control purposes.

It will be understood that in using the above described apparatus for performing the titration, the end point of the titration will be indicated by a reversal or break in the curve defined by the variation in the indication of the current measuring instrument connected to the terminals 22 and 23, during the course of the titration. Said end point can visually be determined by observing the instrument.

While a specific embodiment of an improved high frequency titrimeter has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a titrimeter of the type wherein the end point of a titration is determined by observing changes in resistivity of a solution being titrated to high frequency current, an oscillator arranged to generate a high frequency current, and means for measuring said current, said oscillator having a tank circuit, said tank circuit including a horizontally extending, generally circular loop of rigid conductive material, a circular shielding housing of non-magnetic conductive material concentrically surrounding said loop, said housing having a top wall formed with a circular aperture coaxial with and substantially smaller in diameter than said loop, and a vessel of non-metallic material engaged in said aperture and extending through said loop, said vessel being adapted to contain the solution to be titrated.

2. In a titrimeter of the type wherein the end point of a titration is determined by observing changes in resistivity of the solution being titrated to high frequency current, an oscillator comprising a vacuum tube having a grid, a plate and a cathode, a tank circuit, and current measuring means connected between said grid and cathode, said tank circuit comprising capacitive means connected between the grid and plate and a horizontally extending, generally circular loop of rigid conductive material connected between said grid and plate, a circular shielding housing of non-magnetic conductive material concentrically surrounding said loop, said housing being substantially greater in outside diameter than said loop and having a top wall formed with a circular aperture coaxial with and substantially smaller in diameter than said loop, and a vessel of non-metallic material engaged in said aperture and extending through said loop, said vessel being adapted to contain the solution to be titrated.

3. In a titrimeter of the high frequency type, an oscillator comprising a non-magnetic conductive housing, a vacuum tube having a grid, a cathode and a plate, said tube being mounted on said housing, current-measuring means connected between said grid and cathode, and a tank circuit, said tank circuit including capacitive means comprising a pair of short upstanding sections of concentric cable mounted vertically on the top wall of said housing, means connecting said sections in series between the grid and the plate to define a resultant tank capacitor, respective tank inductance terminals mounted in a side wall of the housing and connected respectively to said grid and plate, and a tank inductance unit, said inductance unit comprising a generally circular housing of non-magnetic conductive material, and a generally circular loop of rigid conductive material secured horizontally in said second-named housing, said loop having parallel terminal elements projecting from the wall of said second-named housing and conductively engaging said inductance terminals, said terminal parallel elements being substantially perpendicular to said last-named wall, the circular main interior portion of said loop being concentric with said second-named housing and spaced a substantial distance inwardly from the walls of said second-named housing so that there is relatively small distributed capacity between the loop and the walls of said second-named housing, said second-named housing having a top wall formed with a circular opening coaxial with the main interior portion of the loop and substantially smaller in diameter than said main interior portion, and a generally cylindrical vessel of non-metallic material extending into said housing through said opening and engaging the rim of said opening, said vessel extending axially through said circular interior portion of the loop and being adapted to contain solution to be titrated.

References Cited in the file of this patent

UNITED STATES PATENTS

| | | |
|---|---|---|
| 1,610,971 | Ruben | Dec. 14, 1926 |
| 1,978,600 | Polydoroff | Oct. 30, 1934 |
| 2,580,670 | Gilbert | Jan. 1, 1952 |
| 2,645,563 | Jensen | July 14, 1953 |
| 2,654,864 | Tuck | Oct. 6, 1953 |